US008913108B2

(12) United States Patent
Barenbrug et al.

(10) Patent No.: US 8,913,108 B2
(45) Date of Patent: Dec. 16, 2014

(54) METHOD OF PROCESSING PARALLAX INFORMATION COMPRISED IN A SIGNAL

(75) Inventors: Bart G. B. Barenbrug, Eindhoven (NL); Christian Benien, Eindhoven (DE); Harald H. A. Van Woerkom, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 283 days.

(21) Appl. No.: 13/123,588

(22) PCT Filed: Oct. 1, 2009

(86) PCT No.: PCT/IB2009/054302
§ 371 (c)(1),
(2), (4) Date: Apr. 11, 2011

(87) PCT Pub. No.: WO2010/041176
PCT Pub. Date: Apr. 15, 2010

(65) Prior Publication Data
US 2011/0199465 A1 Aug. 18, 2011

(30) Foreign Application Priority Data

Oct. 10, 2008 (EP) .................... 08166300

(51) Int. Cl.
*H04N 13/04* (2006.01)
*H04N 9/47* (2006.01)
*H04N 19/597* (2014.01)
*H04N 13/00* (2006.01)

(52) U.S. Cl.
CPC ..... *H04N 13/0022* (2013.01); *H04N 19/00769* (2013.01); *H04N 13/0066* (2013.01); *H04N 13/0018* (2013.01)
USPC ..................... 348/54; 348/E13.026

(58) Field of Classification Search
CPC ........... G02B 27/2214; H04N 13/0404; H04N 13/0409; H04N 13/0418; H04N 13/0422
See application file for complete search history.

(56) References Cited

U.S. PATENT DOCUMENTS

| 6,756,993 | B2 | 6/2004 | Popescu |
| 7,388,583 | B2 | 6/2008 | Redert |

(Continued)

FOREIGN PATENT DOCUMENTS

| EP | 1587329 A1 | 10/2005 |
| WO | WO2005060271 A1 | 6/2005 |

(Continued)

OTHER PUBLICATIONS

Redert A: "Visualization of Arbitrary-Shaped 3D Scenes on Depth-Limited 3D Displays" 3D Data Processing, Visualization and Transmission, 2004. 3DPVT 2004. Proceedings. 2ND International Symposium on Thessaloniki, Greece Sep. 6-9, 2004, Piscataway, NJ, USA, IEEE, pp. 938-942, XP010725305.

(Continued)

*Primary Examiner* — Dave Czekaj
*Assistant Examiner* — Nam Pham
(74) *Attorney, Agent, or Firm* — Larry Liberchuk

(57) ABSTRACT

This invention relates to a method and a device of processing parallax information comprised in a signal. A signal comprising parallax map associated with further image information is received. A first data is obtained from the signal indicative of first parallax map constraints. A second data is obtained from the signal indicative of second parallax map constraints. Third data matching third parallax map constraints of a target device is determined by means of processing the at least first data and the second data. This third data is used to generate an updated signal matching the parallax map information constraints of the target device.

15 Claims, 5 Drawing Sheets

(56) References Cited

U.S. PATENT DOCUMENTS

2006/0050383 A1* 3/2006 Takemoto et al. ............ 359/462
2010/0166338 A1* 7/2010 Lee et al. ...................... 382/285

FOREIGN PATENT DOCUMENTS

| WO | WO2007019347 | A2 | 2/2007 |
| WO | WO2007113725 | A2 | 10/2007 |
| WO | WO2009034519 | A1 | 3/2009 |

OTHER PUBLICATIONS

Kauff et al: "Depth Map Creation and Image-Based Rendering for Advanced 3DTV Services Providing Interoperability and Scalability" Signal Processing. Image Communication, Elsevier Science Publishers, Amsterdam, NL, vol. 22, No. 2, Mar. 16, 2007, pp. 217-234, XP005938670.

Nick Holliman, "Mapping Perceived Depth to Regions of Interest in Stereoscopic Images", Stereoscopic Display and Applications XV, Department of Computer Science, http://www.comp.leeds.ac.uk/edemand/publications/hol04a.pdf.

* cited by examiner

METHOD OF PROCESSING PARALLAX INFORMATION COMPRISED IN A SIGNAL

FIELD OF THE INVENTION

The present invention relates to a method and a device for processing parallax information comprised in a signal.

BACKGROUND OF THE INVENTION

Three-dimensional (3D) display devices add a third dimension (depth) to the viewing experience by providing each of the viewer's eyes with different views of the scene that is being watched. Many 3D display devices use stereo input, which means that two different but related views are provided. This is used, for example, in standard 3D cinema (where glasses are used to separate left and right views for the viewer's eyes). Instead of, for example 50 frames (of image data) a second being provided, in a stereo system 100 frames a second are provided, being 50 for the left eye, and 50 for the right eye. Each frame of a pair comprises a slightly different view of the same scene, which the brain combines to create a three-dimensional image. As a result of the adoption of this technology in 3D cinemas, there is a lot of stereo content available. It is also possible that there are home cinema enthusiasts who will want to replicate the cinema experience at home and build or install stereo projection systems.

However, the use of glasses that are associated with stereo 3D systems is cumbersome for many applications, such as 3D signage and also more casual home 3DTV viewing. Glasses-free systems (also called auto-stereoscopic systems) often provide more than two views of the scene to provide freedom of movement of the viewer, and since the number of views varies, the representation that is often used in these applications is the image+depth format, where one image and its depth map provide the information required for rendering as many views as needed.

A problem that exists with systems that provide parallax information is that the structure of the parallax information (which is additional to the image data), will be optimized for a particular target rendering system or device. For example, if a depth map is provided, then this may be designed with a particular target system in mind. For example, it may be assumed in the creation of the map that the end system is designed to provide 6 different views (the user will only ever see two of the six views, depending upon their position). The choice of 6 views may be based upon what is perceived to be the most likely (or average) configuration of the end system. However the parallax information contained within the signal may not be appropriate for the rendering that will occur at the display device

BRIEF DESCRIPTION OF THE INVENTION

The object of the present invention is to improve upon the known art.

According to one aspect the present invention relates to a method of processing parallax information comprised in a signal, comprising:

receiving a signal comprising at least one parallax map associated with further image information, obtaining first data from the signal indicative of first parallax map constraints, obtaining a second data from the signal indicative of second parallax map constraints, determining third data matching third parallax map constraints of a target device by means of processing at least the first data and the second data, the third data being adapted to generate an updated signal matching the parallax map information constraints of the target device.

It is thus possible, in case that neither the first nor the second data match the constraints of the target device, to use the data as input in generating an updated third data that matches the target device. The image information may be a still image, or a frame or field of a video-sequence.

In one embodiment, the first data and the second data are parallax information transforms, the first and the second parallax map constraints being first and second depth ranges for the image information, the third data being a third parallax information transform and the third parallax map constraints being a third depth range.

With the term with parallax information is meant depth-related information or disparity-related information or a combination of both. Here depth-related information is used for information that represents an indication as to the apparent distance of image information to the viewer/camera. In turn, disparity-related information is used for information that represents an indication as to the apparent shift of image elements between views, i.e. the displacement in images for the left eye and right eye.

In one embodiment, the first parallax information transform is an identity information transform of the received parallax map.

In one embodiment, the second parallax information transform is parallax information transform obtained by using the identity information transform as input which is processed, the processing resulting in outputting the second parallax information transform.

In one embodiment, the signal is a video signal and where the second parallax information transform is comprised in the video signal as metadata.

In one embodiment, the metadata comprises at least one of:
a mapping function related to the parallax information,
an inverse of a mapping function related to the parallax information, and
a coefficient for a mapping function related to the parallax information.

In some cases it might be necessary or possible to determine for example disparity information from cinema stereo, and then add a mapping to transform those disparities to a format more suitable for a reduced-depth-range home 3D display. The disparity for the latter (the result of applying the transform) is then only first generated at the receiving end in the home. This meta-data is a "backwards" mapping to undo a mapping that had been done at the content creation side.

Accordingly, the at least second parallax information transform may be considered as adjusted parallax information suitable to a specific end-receiver. The principle of the metadata is that it makes it possible to obtain data which could otherwise not be obtained from the (original) parallax information without the metadata. As an example, first parallax information is sent to a 3D display device. The metadata relates to the generation of the parallax information, i.e. the methology of how they were obtained (e.g. via a function or a look-up table and the like). The metadata allows the receiver to work back from parallax information to the underlying data that was used to create the parallax information or to new parallax information better suited to a specific target device. The result is that said second parallax information transform is created, i.e. parallax information that is adjusted to a 3D display at the receiver side.

In one embodiment, the step of determining third data matching the third parallax map constraints of the target device comprises interpolating between two respective parallax information transforms from a set of parallax information transforms, the set of parallax information transforms comprising the first and second parallax information transforms, the third data being a third parallax information transform matching the depth range of the target device.

Ideally, a 3D display can show a large parallax range. This however requires several viewing conditions to be met, e.g. the screen must be large, the screen must be watched from a large distance and that the separation between views must be very good. These viewing conditions are not always met. Therefore, this "original depth" gives rise to said first parallax range, whereas said second parallax information transform results in a second depth signal with said second parallax range. The advantage with this embodiment is that when the parallax range of a 3D display device does not match either of these ranges, a novel transform can be computed from the two (or more) transforms by e.g. interpolation. In that way, the depth range of the signal can precisely be tuned to the available parallax range of a 3D display, thereby enabling improved 3D rendering.

In one embodiment, the set of parallax information transforms further comprises a further parallax information transform based on further data from the signal.

In one embodiment, the parallax information transforms used as input in determining the updated parallax information transform are selected based on a selection rule. In one embodiment, the selection rule defines selecting parallax information transforms that fall within a pre-determined depth range of the target device. This predetermined range could e.g. be the closest depth range magnitude.

In one embodiment, the target device is a 3 dimensional (3D) display system and where the respective parallax map constraints comprise at least one from:

the parallax or depth range of the 3D display device,
the display distance between a viewer and the 3D display device, and
a location parameter indicating the position of the viewer from the 3D display device.

In one embodiment, the updated signal is subsequently forwarded to the target device where the updated signal is used to adjust the parallax map so as to render image elements for view information for a three-dimensional image that falls within the available parallax range of the target device. Accordingly, the processing of the parallax information may be performed externally from e.g. a three-dimensional (3D) display device.

According to another aspect, the present invention relates to a computer program product for instructing a processing unit to execute the above method steps when the product is run on a computer.

According to still another aspect, the present invention relates to a device for processing parallax information comprised in a signal, comprising:

a receiver for receiving a signal comprising at least one parallax map associated to image information,
a processor for
obtaining first data from the signal indicative of first parallax map constraints,
obtaining second data from the signal indicative of second parallax map constraints and
determining third data matching third parallax map constraints of a target device by means of processing at least the first and the second data, the third data being adapted to generate an updated signal matching the parallax map information constraints of the target device.

Accordingly, a device is provided that is capable of, in case that neither the first nor the second data match the constraints of the target device, to use the data as input in generating an updated third data that matches the target device. The image information may be still image, or a frame or field of a video-sequence.

The device may be an integral part of a set-top box, Blu-ray Disc player, a 3D display device, a stereo display, a PC computer device, or a portable computer device.

According to still another aspect, the present invention relates to a three-dimensional (3D) display device comprising said device.

In one embodiment, the 3D display device is an autostereoscopic display system.

The 3D display device is a stereoscopic display system or an autostereoscopic stereo display.

The aspects of the present invention may each be combined with any of the other aspects. These and other aspects of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
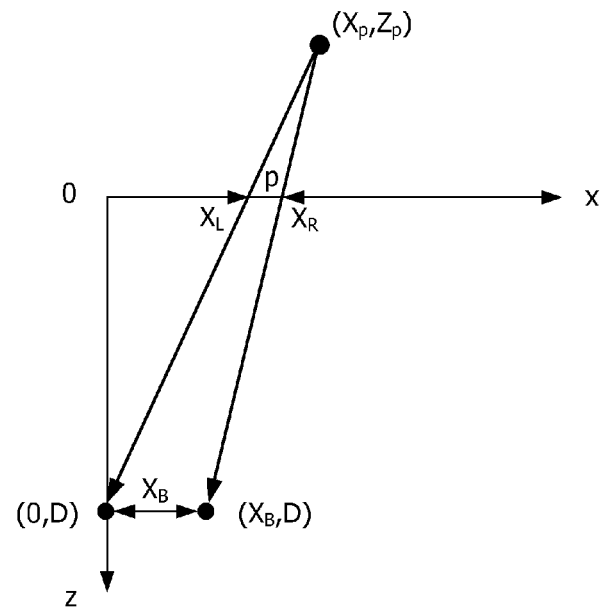
FIG. 1 shows the relation between the screen parallax p, a display distance D between a viewer and a display, an eye distance $x_B$ and a perceived distance $z_p$ of an object measured from the screen surface.

Introduction to Stereoscopic Depth Perception:

When looking how people perceive depth in the real world, the people see the world with two eyes, and each eye sees the world from a slightly different position. The brain fuses the images from the left and right eye to get a 3-dimensional impression.

The depth is perceived through different depth 'cues', of which some work even by closing one eye (or if a person looks at a photograph or a TV). Those are called monocular depth cues (with the exception of accommodation). Depth cues that need both eyes are called binocular depth cues.

The monocular cues include the perspective, motion parallax, texture gradient, relative size, interposition, shading, depth-of-field and accommodation. Accommodation means that when the eyes are focused on a certain object, the brain can estimate the distance of that object from the tension in the eye muscle that controls the focus. It is the only absolute monocular cue, all others are relative.

The binocular depth cues are convergence and stereopsis. Convergence means that the axes of the eyes of a person converge on the object the person is looking at. If a person looks at an infinitely far object, the eyes are parallel, and when the person tries to look at the tip of its nose, the eye lines become crossed. Convergence is also an absolute cue, like accommodation. However, accommodation and convergence are only minor cues compared to stereopsis. Stereopsis, sometimes referred to as "triangulation", means the depth "calculation" by "image processing" which the human brain applies based on the disparity between objects on the retina of the left and right eye.

When considering how stereoscopic depth perception works in a 3D cinema or on any other stereoscopic or autostereoscopic display, the technique is to show a different image to each eye. This can be achieved by encoding the left and right images with different color (anaglyph, Dolby/Infitec), by using polarized light, or by showing left and right images sequentially. All these methods require the viewer to wear glasses to filter out the left and right images. The alternative are autostereoscopic displays that don't require the viewer to wear glasses, but show different images to the left and right eye, based on e.g. barriers or lenses on the display. The quality of all methods is determined by how good the separation between left and right image is. If some part of the left image is visible in the right eye, too (or vice versa), the resulting effect is called ghosting or cross-talk, and it can reduce the 3D experience.

Objects that appear to be on the surface of the screen have identical images for the left and right eye. Any object floating behind or in front of the screen is shifted slightly in the left/right images. The shift in the image is usually measured in pixels, and is called 'disparity'. Since that results in a different effect depending on the resolution of the image and the screen size, one only looks at the shift of the object on the screen surface, which is referred to as 'screen parallax'. It is defined as a physical distance in order to be independent from a specific resolution or screen size.

FIG. 1 shows the relation between the screen parallax p, the display distance D between the viewer and the display, the eye distance $x_B$ and the perceived distance $z_p$ of the object, measured from the screen surface. The x-axis represents the display panel and the z-axis the distance from the display panel.

The relation can be expressed as follows:

$$p = x_B \cdot \left(1 - \frac{D}{D - z_p}\right).$$

It is possible to derive the following properties from the equation:

The screen parallax p is 0 when the perceived depth $z_p$ is 0.

The screen parallax p is positive when the object appears to be behind the screen, and negative when the object appears to be in front of the screen.

For infinitely far objects ($z_p \rightarrow \infty$), p equals the eye distance $x_B$. This is the upper bound of p.

An object that floats halfway between the viewer and the screen (with $$z_p = \frac{D}{2}$$

has a parallax of $p = -x_B$.

An object that has a distance of $$\frac{D}{3}$$

from the viewer has a parallax of $p = -2x_B$, and object that has a distance of $$\frac{D}{4}$$

has a parallax of $p = -3x_B$, and so on.

Sometimes, it is easier to formulate the equation in a different way. Instead of the absolute distance from the screen surface, it is possible to focus on the relative distance of an object from the viewer (using the screen distance D as reference). The relative depth can be expressed as:

$$d = \frac{D - z_p}{D}.$$

This measure is sometimes called 'apparent depth'. If d is 100%, the object appears to be on the screen surface, if d is 50%, it floats halfway between the viewer and the screen. If it is greater than 100%, the object appears to be behind the screen. By rewriting the original equation in terms of d, $$p = x_B \cdot \left(1 - \frac{1}{d}\right),$$

and solving it for d, gives $$d = \frac{x_B}{x_B - p}.$$

The above equations are general and apply to all screen sizes, and viewer distances. Unfortunately, is not so easy to create a perfect 3D experience on a real screen, because of the following reasons:

the screen size is limited,
there is an accommodation/convergence mismatch,
motion parallax is missing and
The field of view is limited.

To find out why screen size is a problem, one should look at the so-called stereo window, which is the frame around the visible image. By shifting left and right images horizontally, it is possible to influence which objects appear on the screen plane, in front of it, or behind it. Any object behind the screen plane automatically feels natural, almost like looking through a real window. Problems arise when objects that float in front of the screen are cut off by the screen border. This is a called window violation. If, for example, an object floats in front of the screen and touches the left border on the image for the left eye, parts of the object are cut off in the image for the right eye. The human brain gets conflicting cues, the stereopsis cue tells it that the object is in front of the screen, but the occlusion cue tells it that the object is hidden behind the screen border, and must therefore be behind the screen. To a lesser extent it also feels unnatural to have objects cut off at the top or bottom border.

Currently, only an IMAX screen is wide enough so that persons don't have to worry about window violations on the left/right borders. On normal cinema screens (approx 10 m width), window violations start to become a problem and on 3D television sets the problem is inevitable. Looking at above equations, one can see that to get the same 3D effect in terms of relative depth, the physical screen parallax is identical, regardless of screen size. To show infinitely far objects in a cinema, the left and right images are shifted by $x_B$=65 mm . This is approximately 0.5% of the screen width. To show infinitely far objects in a 3D TV, the left and right images are shifted by 65 mm as well, but now the shift is almost 5% of the screen width. To show an object which floats in front of the screen at a relative distance of 25%, one needs a margin of at least 1.5% of the width of a cinema screen, but a 15% margin for a TV. Thus, it is a lot harder to have objects hovering in front of peoples nose with a 3D TV. It only works for objects which are more or less in the center of the screen.

The conclusion is that smaller screens automatically limit the amount of depth that can be shown.

The other major problem is the accommodation/convergence mismatch. Regardless of where the object appears to be, behind or in front of the screen, one still has to focus the eyes on the screen. Simply put, only one of the two absolute depth cues is used in stereoscopic projection, and it contradicts the other one. For an inexperienced 3D audience, the rule of thumb is to avoid retinal disparities of more than 1.5 degrees. Anything more than 1.5 degrees leads to eye-strain, and sometimes people are unable to fuse both images into one, and will not see any 3D effect. This depends mainly on the quality of the monocular depth cues that help us to fuse the images with stereopsis. The retinal disparity can be calculated as follows:

$$\beta = \tan^{-1}\left(\frac{p}{D}\right).$$

Again, the 3D cinema has the advantage here, because the physical parallax p is small compared to the screen distance D. Assuming a screen distance of D=10 m, then the retinal disparity for infinitely far objects is only around 0.37 degrees.

Objects that float at a relative distance of 20% have a retinal disparity of 1.48 degrees, and are about as near as one should go in a cinema.

By looking again at the equations for the relative depth, assume a viewer sits in front of a stereo screen. Objects with a relative depth of 50% appear to be halfway between the viewer and the screen. Now, by moving closer to the screen—the same object still has a relative depth of 50%, but its depth compared to the size on the screen changes. The object has less absolute depth. If the viewer moves away from the screen, the absolute depth is increased. Only in a certain 'sweet spot' the viewer gets the correct ratio between depth and 2D size. If the viewer sits in that position, the field of view (i.e. angle how large the screen appears to you) is the same as the field of view of the camera. This condition is also called ortho-stereopsis, the perfect reproduction of depth that was observed by the camera.

It is impossible to achieve this condition for all viewers. Even for a single viewer, it means that the whole content has to be created with a single camera lens and without zoom. Viewers can easily tolerate too little depth, since that is what they are used to in 2D TV and 2D cinema, by they should avoid too much depth which could look unnatural.

How Depth Scaling works for different Screens:

Depth scaling is a process of converting the depth stored in a format to the target screen's depth range. With the term depth scaling is preferably meant mapping a disparity/parallax to another disparity/parallax. Various formats such as WOWvx format can show 3D on any screen, for autostereoscopic displays in mobile phones to stereo projection in cinemas, by always using the full depth capabilities of each screen while eye strain and viewing discomfort are reduced to minimum. It should however be noted that the format should not be limited to a certain 3D format, but other formats such as 2D plus Depth file and interface format could just as well be used.

The aim here is to show content having an appropriate format on any available 3D screen, from hand-held devices to cinema screens. As such, the format should contain a large depth range, so that enough information is available to show it on big screens. As mentioned herinbefore, several factors have to be considered to find the optimal transform of the original depth information to the target screen.

Starting with the big screens and then go down to hand-held size and investigate for each screen size what the optimal configuration is.

Assuming a file is provided which contains a depth range of 25% to infinity in terms of relative depth. This means the closest objects are floating in front of the audience at ¼ of the screen distance, and the farthest objects are at infinite depth. The parallax range goes from 65 mm (infinitely far away) to −195 mm (25% relative depth).

Cinema Screens:

On a cinema screen, or to be more precise, on any cinema screen, there is enough distance between audience and screen, so the accommodation/convergence discrepancy is not an issue and one does not expect problems with the stereo window. Consequently, any cinema screen can show the depth range that is encoded in the appropriate format, and there's no need to transform the depth information. Note that this is not the same as showing the same stereo images on each screen—the physical screen parallax stays the same, but this leads to a pixel disparity that depends on the screen size and pixel resolution. An exception is IMAX because the field of view is larger than in normal cinemas. To keep the depth aspect ratio of content that was created for a normal cinema, it could be beneficial to move the screen plane away from the audience.

Stereoscopic 3D TV:

Considering a stereoscopic 3D TV with 3D glasses and a screen width of 1m (approximately 45" diagonal), the usual distance between audience and TV set is 3 m.

It is clear that it is not possible to show the whole depth range of the original content, because 25% of relative depth would lead to a retinal disparity of 3.72 degrees—generally perceived as being too much for comfortable viewing. Even infinite depth may lead to eye strain if a viewer has to look at it continuously, though it only has a retinal disparity of 1.24 degrees.

Another problem is that a screen parallax of −195 mm takes up almost 20% of the screen. This would require a margin of at least 20% on both sides of the object which is supposed to float in front of the screen in order to not violate the stereo window.

Additionally, if the original content was intended for a cinema screen, then it is likely that watching it on a smaller screen, but with the same physical screen parallax leads to a feeling of "too much depth". This is caused by a disproportionate depth aspect ratio, caused by the now different fieldof-view. Objects are smaller in size, but still have the same depth, e.g. a ball which now appears to have the form of a cucumber.

Finally, one should also try to leave the screen plane where it was intended to be, and not move it too much towards or away from the viewer. The reason is simple: most of the content where a viewer has to focus on (e.g. small text or other fine details) is best shown on the screen plane to avoid eyestrain, and content is usually created to put the objects that the content creator would like the viewer to focus on at that depth. By taking all 4 factors into account, a good depth range for the 3D TV could be 25mm to −75 mm (in terms of parallax) and 46.4% to 162.5% (in terms of relative depth). That's of course very subjective and just a safe default.

Figure 2:
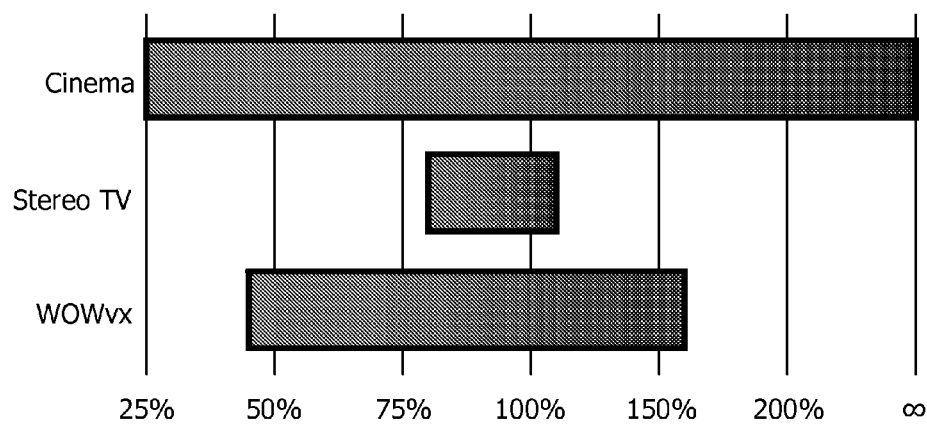
FIG. 2 shows a comparison of depth ranges typical for Stereo TV, Cinema, and state-of-the-art autostereoscopic displays.

It is interesting to compare this depth range to what a viewer would get if the viewer is shown a stereo movie created for the cinema screen on the same TV set. Assuming the content is the same as mentioned above, and the movie was made for a 40' screen size, then the resulting depth range is 5.3 mm to −16 mm (in terms of screen parallax) and 80% to 109% (in terms of relative depth). With as an example the WOWvx format, the depth effect can be made up to 4 to 5 times stronger. A diagram comparing the difference is shown in FIG. 2, which shows a comparison of depth ranges of a typical cinema content shown on a cinema screen, the same stereo (L/R) images shown on a stereoscopic TV, and the same content adapted with WOWvx technology (depth scaling and parallax information transforms) shown on the same stereoscopic TV.

Constrained Screens and Smaller Displays:

Contemporary autostereoscopic displays and smaller displays in general have a constrained depth and parallax range, simply because the displays are not large enough to show sufficient parallax without using up a significant amount of the screen width, or because multiview autostereoscopic displays have to render several views and need a multiple of the parallax range used by a stereoscopic display of the same size.

To use this limited depth range to maximum effect, it is possible to use one of the following methods:

Not every shot/scene uses the full depth range, and it is possible to map the depth range of each shot to the depth range of the display. It is not possible to get consistent depth over different shots, and there is no absolute measure of depth, but that is not noticeable on such screens.

In shots that do use the full depth range, reducing it to only a fraction of the original depth range leads to a cardboardinq effect, where e.g. faces and other objects appear flat. A good solution is to increase depth inside of objects at the cost of depth between objects. This can be achieved by embedding a parallax transform in the format.

Objects that are the focus of the scene can be surrounded with a near and far plane, or a viewing frustum. On a constrained screen, anything behind the far plane is projected on the display's far plane and anything in front of the near plane is clipped/projected to the near plane. This can also be achieved by embedding a parallax transform in the format.

The viewing conditions for a 3D display device are not always met. This would require that the screen is large and that it must be watched from a large distance and that the separation between the views must be very good. These viewing conditions are however not always met; hence sometimes an image+depth signal can exhibit too large parallax range if it was meant for a 3D display device with less restrictive depth capabilities. It can also be the case that the content was made for a display with a limited depth range, which means more depth could be visualized on a less restrictive display. Simple linear stretching of depth can come a long way to increase or decrease the amount of depth, but sometimes a more scene-specific transformation of parallax is called for. Such mappings are known in the art, as described in for example "*Nick Holliman, Mapping Perceived Depth to Regions of Interest in Stereoscopic Images, in Stereoscopic Displays and Applications XV,* 2004, available as http://www.comp.leeds.ac.uk/edemand/publications/hol04a.pdf", hereby incorporated by reference.

Figure 4:
FIG. 4 shows a parallax map before a transform.
Figure 5:
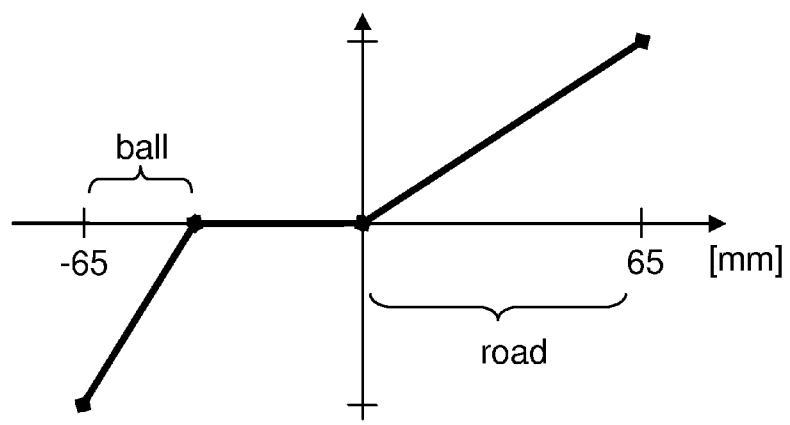
FIG. 5 shows an example of parallax transform for constrained screens.
Figure 6:
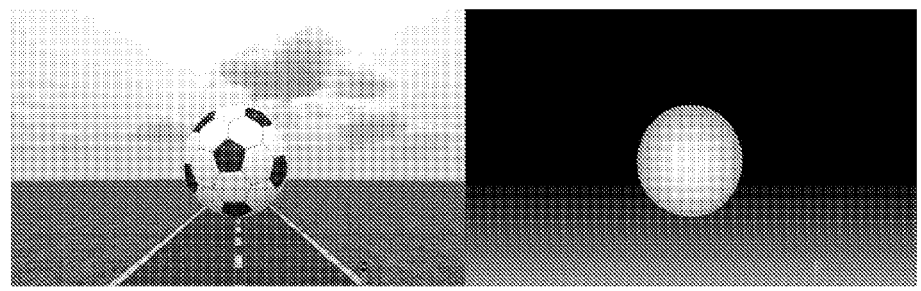
FIG. 6 shows a parallax map after transform.

An example of the use of such a mapping is given in FIGS. 4-6. The left side of FIG. 4 shows a scene of a road that appears to be behind the screen and which extends from screen depth to infinity, and the right side the parallax map. Very close to the viewer a ball is hovering. There is a large gap in depth between the ball and the visible part of the road. The parallax range for the whole range may as an example be −65 mm to 65 mm. For screens with constrained depth range, the ball appears very flat when scaling disparity linearly. It would be more pleasant to have the ball use the whole available space in front of the screen. This can be achieved with a parallax transform as shown in FIG. 5, where the x-axis contains the input parallax of the transform, and the y-axis shows the output parallax. The positive parallax values are scaled linearly (positive parallax is behind the screen, in this case this is the road). Doing anything else than linear scaling would cause a discrepancy between monocular and binocular depth cues, and a recreating other views would show a curved/bent road instead of a straight one. The parallax range of the ball from −65 mm to e.g. approximately −40 mm is scaled linearly to use the full "space" in front of the constrained screen. The gap between the foreground and background object (the parallax range −40 mm to 0 mm) is removed. A parallax mapping as shown in FIG. 5 will accomplish this and result in a modified parallax map (using a smaller parallax scale) as shown in FIG. 6. As will be discussed here below, the identity transform, i.e. the actual depth data for display of the image in FIG. 4, along with the supplied transform, the depth data for display of the image in FIG. 6, is used to derive a new one for display range of a specific target device. It should be noted that the parallax transforms are preferably used because different 3D displays have different depth range visualization characteristics. As an example, on smaller screens the depth range is usually smaller than on a big cinema screen, where one can have objects almost touch the viewer's nose.

Figure 7:
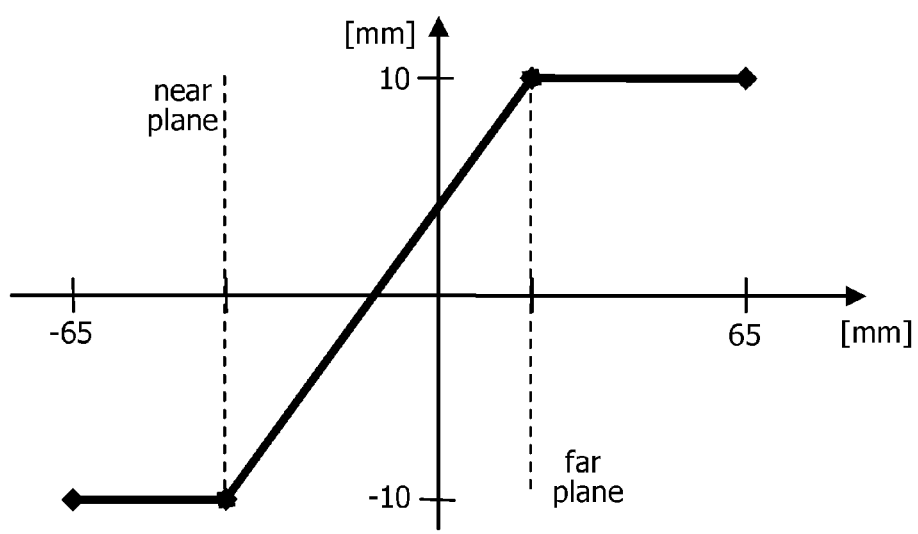
FIG. 7 shows another example of a parallax mapping.

Another example of a parallax mapping is shown in FIG. 7, which identifies a range of interest between a far and near plane to which the display's depth range is allocated, clipping any depth values outside that range.

It should be noted that by receiving such a parallax map as shown in FIG. 4 (the right figure), from this parallax map it is possible to derive said mapping (in this case the identity mapping) from the parallax map, e.g. the parallax transform characterized by (−65 mm, −65 mm), (65 mm, 65 mm), instead of the mapping shown in FIG. 5.

It is advantageous to send parallax transforms describing these mappings along with depth maps so that the mapping can be applied (or not) at the receiving end where the viewing conditions and the 3D display properties are known. This way, the content can be viewed on displays with a variety of parallax range capabilities because the parallax maps can still be adapted to the 3D display and viewing conditions. So the image and depth from FIG. 4 could be accompanied by information describing the parallax transform shown in FIG. 5, or conversely, if the depth map from FIG. 6 would be encoded in the content, the inverse of the transform shown in FIG. 5 could be sent along as meta-data to allow reconstruction of the depth map shown in FIG. 4.

Furthermore, the original depth signal (or rather the metadata like the parallax scale and offset in MPEG-C part 3) gives rise to one parallax range, whereas applying the provided parallax transform results in a second depth signal with a second parallax range.

Furthermore, the original depth signal (or rather the metadata like the parallax scale and offset in MPEG-C part 3) gives rise to one parallax range, whereas applying the provided parallax transform as described in PH008849EP1 results in a second depth signal with a second parallax range.

In one embodiment, the aim of present invention is to deal with the scenario where neither of the said parallax ranges, i.e. neither the parallax range of the original depth signal nor second parallax range matches parallax range of a target 3D display. In such a situation, a novel transform can be computed from the two transforms (e.g. the provided transform and the identity transform) by interpolation (or if need be extrapolation). In this way, the depth range of the signal can be tuned to the available parallax range of a 3D display.

Figure 3:
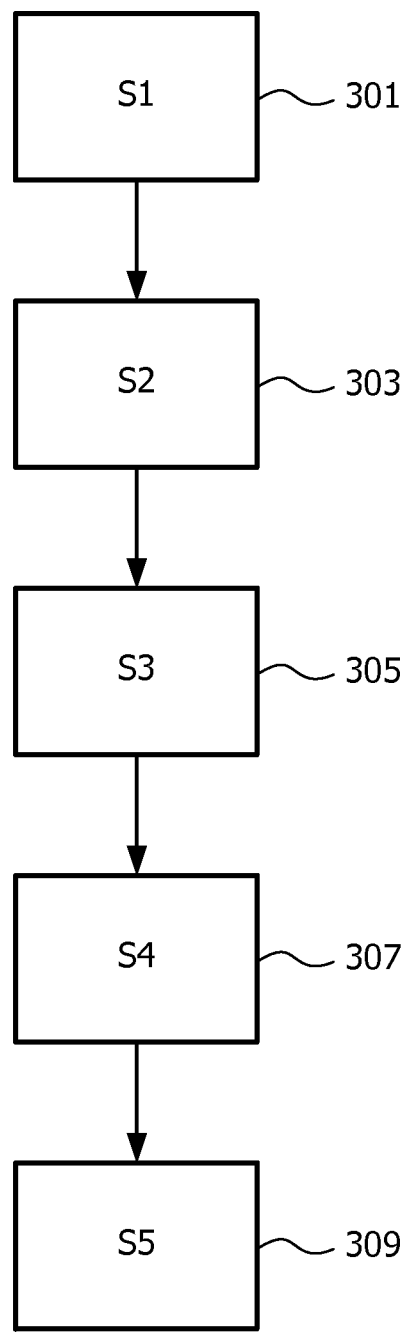
FIG. 3 shows a flowchart of a method according to the present invention.

FIG. 3 shows a flowchart of a method according to the present invention of processing parallax information comprised in a signal.

In step (S1) 301, a signal is received comprising a parallax map associated with further image information.

In step (S2) 303, first data is obtained from the signal indicative of first parallax map constraints.

The data indicative of the parallax map may be either parallax information (a.k.a disparity information, indicating the (horizontal) amount of displacement between views), or distance information (data indicative how far in front or behind of the display the scene at that location is positioned). The parallax map constraints may as an example include the display distance between a viewer and the 3D display device, or a location parameter indicating the position of the viewer from the 3D display device, a combination thereof.

In step (S3) 305, second data is obtained from the signal indicative of second parallax map constraints.

In step (S4) 307, third data matching third parallax map constraints of a target device is determined by means of processing at least the first data and the second data. This third data is adapted to generate an updated signal matching the parallax map information constraints of the target device.

In one embodiment, the first data and the second data is parallax information transforms and the first and the second parallax map constraints is first and second depth ranges for the image information.

The term parallax information may include depth-related information or disparity-related information or a combination of both.

In this embodiment, the third data is third parallax information transform and the third parallax map constraint is a third depth range. In one embodiment, this first parallax information transform is an identity information transform of the received parallax map, i.e. the actual depth data for display of the image, and the at least second parallax information transform is parallax information transform processed from the identity information transform (see FIG. 4-6).

This at least second parallax information transform may be comprised in the video signal as metadata, where the metadata comprises at least one mapping function used in the generation of the parallax information transform, or at least one inverse of a mapping function used in the generation of the parallax information transform, or at least one coefficient for a mapping function used in the generation of the parallax information transform, or a combination thereof.

In one embodiment, the step of determining third data matching the third parallax map constraints of the target device comprises interpolating between two respective parallax transforms from a set of parallax information transforms, the set of parallax transforms comprising the first and second parallax transforms, the third data being a third parallax information transform matching the depth range of the target device. The two or more parallax information transforms may be selected from the second parallax information transforms or from the identity information transform of the received parallax map and one or more of the second parallax information transforms. In another embodiment, the interpolation comprises interpolating between two (or more) depth maps which each have their range.

Accordingly, if more than one parallax transform is provided, higher-order interpolation can be used, or a suitable subset of the available transforms chosen to perform interpolation. One common implicit third transform is the linear transform which linearly compresses or expands the content parallax range to the display parallax range.

The selection of which two or more parallax information transforms used as input in determining the updated parallax information transform may be selected based on a selection rule. This selection may be based on selecting those parallax information transforms that fall within a pre-determined depth range of the target device. As an example, the selection of which two or more transforms to use could be based on selecting those parallax information transforms which range lie closest to the target device range, preferably one having smaller and one having larger range.

Figure 8:
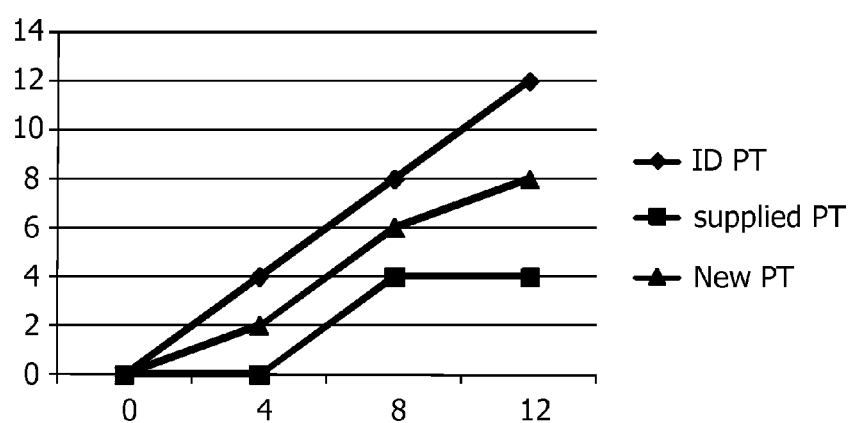
FIG. 8 depicts graphically an example of an interpolation between two parallax information transforms to obtain a third parallax information transforms matching a target device constraints.

As an example, suppose the parallax range of the original depth data is [0 . . . 12], and suppose a parallax transform is available which maps this range to [0 . . . 4], maybe by selecting the sub-range [4 . . . 8] from the 0 to 12 and clipping values below 4 and above 8. This transform can be characterized by the mappings of 0->0, 4->0, 8->4 and 12->4 (with linear interpolation between them). If the target device is a display device which has a depth range of [0 . . . 8], it is possible to compute a new parallax transform by interpolating between the identity transform and the supplied parallax transform. Since 8 is the average of 12 and 4, this is accomplished by averaging the mappings. The result is a mapping: 0->(0+0)/2, 4->(0+4)/2, 8->(4+8)/2, 12->(4+12)/2. This new transform can then be applied to the parallax data instead of the supplied transform (so for example a parallax of 2 would map to 1, since 0 maps to 0 and 4 maps to 2). This is depicted graphically in FIG. 8, where the "diamonds" indicate the parallax range of the original depth data [0 . . . 12], the "triangle" the parallax range of the supplied parallax transform which maps this range to [0 . . . 4] and the triangles are the third and new parallax transform [0 . . . 8]. This is an example of how a novel transform can be computed from two transforms by interpolation. In this way, the depth range of the signal can precisely be tuned to the available parallax range of a 3D target display.

The interpolation may also be done using parallax transforms which have "control points" at different locations. E.g. referring the previous example, the supplied parallax transform in the example has control points at 0, 4, 8 and 12. If there were another parallax transform 0->0, 6->8, 12->12 (an extra control point at (6,8) compared to the identity transform), interpolation would have to compute for this parallax transform what the values are at 4 and 8, and for the former parallax transform what the value is at 6, and then a new parallax transform would be created with control points at 0, 4, 6, 8, and 12.

Continuing with the flowchart in FIG. 3, in step (S5) 309 the updated signal is subsequently forwarded to the target device where the updated signal is used to adjust the parallax map so as to render image elements for view information for a three-dimensional image, that falls within the available parallax range of the target device. This step discloses the scenario where the above mentioned processing steps are performed externally from the target device, i.e. the above mentioned processing steps do not necessarily be performed by the target device, but with any receiver device (not the target device). Such a device may be a processing unit which allows the processor to transform the data by interpolating in order to derive a signal suitable for requirements presented by the target device, e.g. the 3D display device. As a result the processing device could be in a set-top box (e.g. when the incoming signal already has two relevant signals associated), it could be in a 3D display device, it could be in a "display adapter" that converts information in memory to video output to a display, or a program running on a PC computer.

Figure 9:
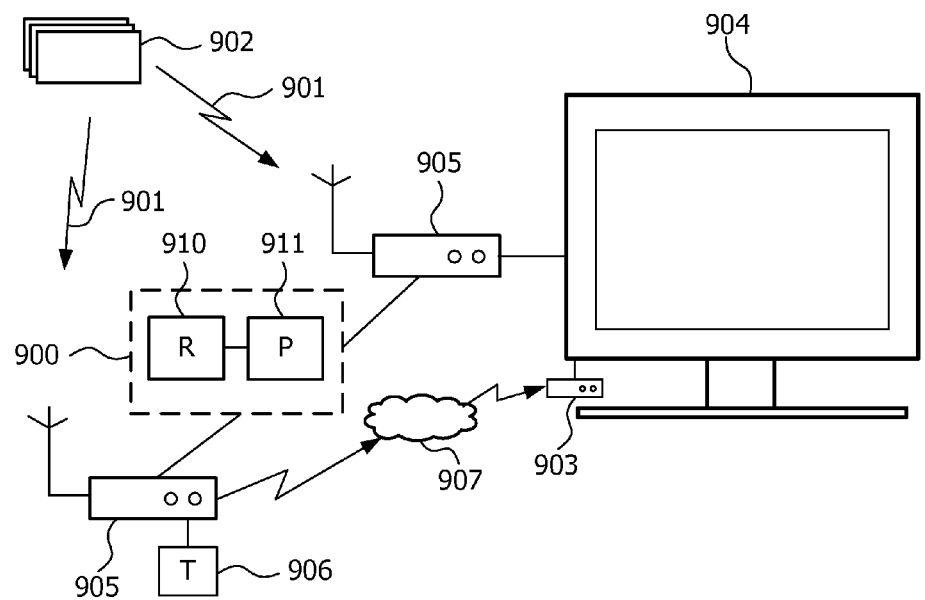
FIG. 9 shows a device according to the present invention.

FIG. 9 shows a device 900 for processing parallax information comprised in a signal 901, where the device 900 comprises a receiver (R) 910 and a processor (P) 911. The receiver is adapted for receiving a signal comprising a parallax map associated to image information 902. The processor (P) 911 is adapted for obtaining first data from the signal indicative of first parallax map constraints, obtaining second data from the signal indicative of second parallax map constraints, and determining third data matching third parallax map constraints of a target device 904 by means of processing at least the first and the second data. This third data is adapted to generate an updated signal matching the parallax map information constraints of the target device 904. The processing steps performed by the processor (P) 911 have already been discussed in the flowchart in FIG. 3.

The device may be an integral part of a set-top box 905, Blu-ray Disc player 905, a 3D display device 1000, a stereo display, a PC computer device 905, a portable computer device, and the like.

As depicted in FIG. 9 and as discussed previously in FIG. 3, the processing may be performed at the display device side (i.e. at the end-receiver side), or externally where the third data is subsequently transmitted by a transmitter (T) 906 to the target device 904 via a wired or wireless communication channel 907, which is provided with a receiver 903 to receive the process the information so as to generate the updated signal matching the parallax map information constraints of the target device 904. In case of the externally processing, the display device 900 might be adapted to read in e.g. a .wowvx file with a parallax transform in it, and set the output mode for compositor to a stereo mode for a certain display (which has a certain range). In that way the compositor would render a left and right picture using the adjusted parallax.

As an example, a Blu-ray disc may contain video+parallax information for a certain 3D depth range and a parallax transform which allows mapping the parallax information to a new parallax map which can be used for a second display type with a different depth range. The Blu-ray disc player can play this disc, convert the information from the compressed format to a display format and send all this information via for example HDMI to a 3D display device. Either the display device or the Blu-ray disc player can apply the method disclosed herein to compute a novel parallax transform which can be used to map the parallax information to the display range of the 3D display in question (the Blu-ray disc player could ascertain the display's display range from for example the EDID information). If the Blu-ray disc player would implement the method, it would replace the parallax transform read from the disc with the novel transform which fits the 3D display device when communicating the video data to the display. Alternatively, the Blu-ray player could apply the novel parallax transform to the parallax maps read from the disc, and send the novel parallax maps to the display instead of the ones read from disc. There would then be no need anymore then to send a parallax transform anymore would provide compatibility for a 3D display which does not implement the method disclosed herein. Alternatively, the original parallax transform from the disc is sent to the 3D display and the 3D display carries out the method disclosed herein to compute a novel parallax transform.

Figure 10:
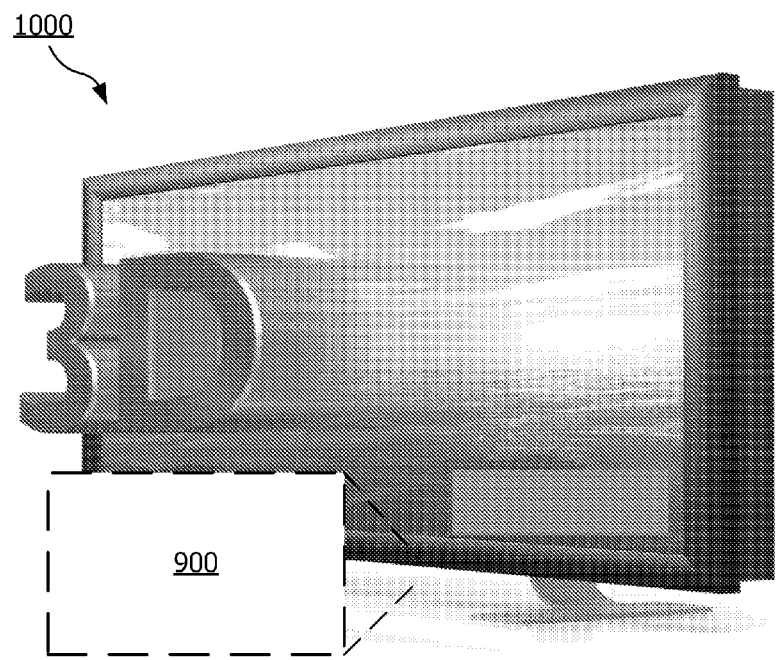
FIG. 10 shows a three-dimensional (3D) display device according to the present invention comprising said device.

FIG. 10 shows a three-dimensional (3D) display device 1000 comprising the device 900 from FIG. 9. This 3D display device may be an auto-stereoscopic display system, a stereoscopic display system or a stereo display.

The method according to the present invention may be implemented advantageously on a wide variety of processing platforms. Implementations can be envisaged that operate on a general purpose computer, digital signal processor or another programmable processor. Alternatively the invention may be implemented in a pre-programmed hardware implementation comprised on an Application Specific Integrated Circuit.

While the invention has been illustrated and described in detail in the drawings and foregoing description, such illustration and description are to be considered illustrative or exemplary and not restrictive; the invention is not limited to the disclosed embodiments. It is further noted as described above with reference to FIG. 10 that the invention may be embodied in a product such as a display, a set top-box, or other device. In the latter case the invention may be incorporated in, implemented on processing platforms targeted at this very purpose and/or more general purpose processing platforms.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of processing parallax information comprised in a signal, the method being performed by an image signal processing platform, and the method comprising:
   receiving a signal comprising at least one parallax map associated with other image information,
   obtaining from the signal a first data indicative of first constraints of the parallax map,
   obtaining from the signal a second data indicative of second constraints of the parallax map,
   determining a third data that matches third parallax map constraints of a parallax map of a target device by means of processing at least the first data and the second data, the third data being adapted to generate an updated signal matching the parallax map constraints of the target device,
   wherein each of the first, second and third constraints is a region of depth values for the other image information bounded by upper and lower limits, and wherein the target device is a 3 dimensional (3D) display system.

2. The method according to claim 1, wherein the first data and the second data are first and second parallax information transforms, the first and the second parallax map constraints being first and second depth ranges for the image information, the third data being a third parallax information transform and the third parallax map constraints being a third depth range,
wherein each of the first and second parallax information transforms is a mapping of a range of input parallax values to a range of corresponding output parallax values.

3. The method according to claim 2, wherein the first parallax information transform is an identity information transform of the received parallax map, the identity information transform being the actual depth data for display of the image information.

4. The method according to claim 3, wherein the second parallax information transform is parallax information transform obtained by using the identity information transform as input which is processed, the processing resulting in outputting the second parallax information transform.

5. The method according to claim 4, wherein the signal is a video signal and where the second parallax information transform is comprised in the video signal as metadata.

6. The method according to claim 5, wherein the metadata comprises at least one of:
a mapping function related to the parallax information,
an inverse of a mapping function related to the parallax information, and
a coefficient for a mapping function related to the parallax information.

7. The method according to claim 2, wherein the step of determining third data matching the third parallax map constraints of the target device comprises interpolating between two respective parallax information transforms from a set of parallax information transforms, the set of parallax information transforms comprising the first and second parallax information transforms, the third data being a third parallax information transform matching the depth range of the target device.

8. The method according to claim 7, wherein the set of parallax transforms further comprises another parallax transform based on other data from the signal.

9. The method according to claim 7, wherein the parallax information transforms used as input in determining the updated parallax information transform are selected based on a selection rule.

10. The method according to claim 9, wherein the selection rule defines selecting parallax information transforms that fall within a pre-determined depth range of the target device.

11. The method according to claim 1, wherein the respective parallax map constraints comprise at least one from:
the parallax or depth range of the 3D display device,
a display distance between a viewer and the 3D display device, and
a location parameter indicating a position of the viewer from the 3D display device.

12. The method according to claim 2, wherein the updated signal is subsequently forwarded to the target device where the updated signal is used to adjust the parallax map so as to render image elements for view information for a three-dimensional image that falls within the available parallax range of the target device.

13. A non-transitory storage medium on which are stored instructions which, when executed by one or more processors, carry out the method of claim 1.

14. A device for processing parallax information comprised in a signal, comprising:
a receiver for receiving a signal comprising at least one parallax map associated with other image information,
a processor for
obtaining from the signal a first data indicative of first constraints of the parallax map,
obtaining from the singal a second data indicative of second constraints of the parallax map, and
determining a third data that matches third constraints of a parallax map of a target device by means of processing at least the first and the second data, the third data being adapted to generate an updated signal matching the parallax map information constraints of the target device,
wherein each of the first, second and third parallax map constraints is a region of depth values for the image information bounded by upper and lower limits, and wherein the target device is a 3 dimensional (3D) display system.

15. A three-dimensional (3D) display device comprising a device as claimed in claim 14.

* * * * *